United States Patent [19]

Ballas, Sr.

[11] 4,156,312

[45] May 29, 1979

[54] ROTARY CUTTING

[75] Inventor: George C. Ballas, Sr., Houston, Tex.

[73] Assignee: Weed Eater, Inc., Houston, Tex.

[21] Appl. No.: 814,254

[22] Filed: Jul. 11, 1977

Related U.S. Application Data

[63] Continuation-in-part of Ser. No. 746,685, Dec. 2, 1976.

[51] Int. Cl.$^2$ .......................................... A01D 55/18
[52] U.S. Cl. .................................................. 30/276
[58] Field of Search ................... 30/276, 347; 56/12.7, 56/295; 310/68 D

[56] References Cited

U.S. PATENT DOCUMENTS

| | | | |
|---|---|---|---|
| 3,527,971 | 9/1970 | Means | 310/68 D |
| 3,693,255 | 9/1972 | Langenstein | 30/276 |

*Primary Examiner*—Jimmy C. Peters

[57] ABSTRACT

Apparatus for cutting, trimming, and edging vegetation, and the like, is provided with a rotatable disc-like head having at least one string-like cutting member removably attached thereto and replaceably extending from its periphery for cutting adjacent vegetation and the like. An electrical drive motor having an air cooled rectifier interconnected therewith is provided for increasing cutting efficiency.

8 Claims, 2 Drawing Figures

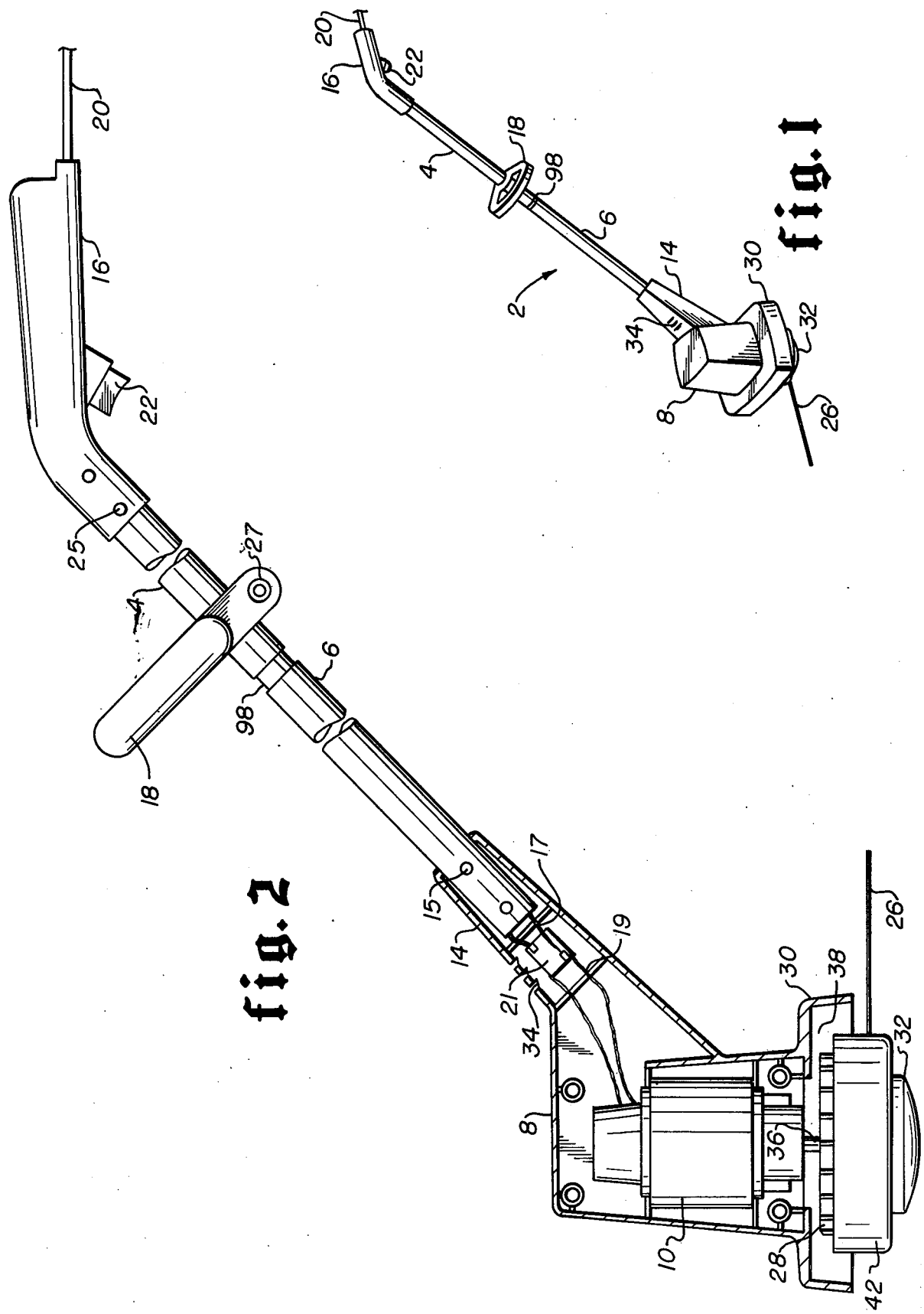

ROTARY CUTTING

RELATED APPLICATIONS

This application is a continuation-in-part of prior copending application Ser. No. 746,685, filed Dec. 2, 1976.

BACKGROUND OF INVENTION

This invention relates to apparatus for cutting vegetation and the like, and more particularly relates to improved apparatus for cutting vegetation with a flexible non-metallic cord member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776; is now widely known and used for this purpose.

This invention relates to an improved cutting assembly in the form of a rotary head for a rotary edger, trimmer or the like. The preferred embodiment is in the form of a portable hand-held type edging tool wherein the cutting element is safe in most uses and avoids the hazardous conditions created by prior art devices. More particularly, the cutting assembly disclosed herein is of the type depicted in Ser. No. 746,685, and is an improvement thereover.

There is also depicted and described in U.S. Ser. No. 746,685, a cutting and trimming device having a head member arranged to be rotated, and containing a spool housed therein. A length of flexible non-metallic line is coiled about the spool whereby the free travelling end of the line extends generally peripherally from the head member and whereby the free travelling end will be swung arcuately about upon rotation of the head member to cut adjacent vegetation in the manner of a flail.

On the other hand, the device of Ser. No. 746,685, is also subject to certain minor disadvantages of a magnitude such as not to limit its practical value but which reduce the efficiency thereof to a slight degree. In the first place, it has been found that during extended usage of the device, substantial heat is generated within the motor housing particularly due to the presence therein of a full wave bridge rectifier. Because of the internal resistance of the rectifier, the generated heat has at times been sufficient to actually soften or melt the plastic of the motor housing adjacent the rectifier.

One attempt to solve the heat generation problem has been to provide air circulation openings in the tubular handle of the device. Such openings, however, have not provided sufficient cooling during extended usage since they are not in direct communication with the rectifier where a substantial portion of heat is generated.

The disadvantages of the prior art, are overcome with the present invention, and commercially acceptable embodiments of a vegetation cutter and the like are herein provided which are not only fully capable of cutting vegetation under most operating conditions, but which are also fully capable of other tasks completely beyond the capabilities of prior devices, such as cleaning dead leaves, trash and other such debris from along fences, walls and the trunks or stems of trees and bushes. More particularly, however, the embodiments of the present invention are capable of operation with a much higher efficiency and much lower breakage rate for their cutting strings.

SUMMARY OF INVENTION

This invention is for an improved cutting assembly for a rotary edger, trimmer or the like. It includes a body member arranged for rotation about an axis generally perpendicular with or normal to the cutting plane. It preferably includes one non-metallic cutting line attached to the body member for rotation therewith in the cutting plane, although a pair of lines may be effective for present purposes under proper circumstances. More particularly, provision is made via air vent openings for the reduction of heat generated by the rectifier and prevention of heat build-up in order to provide for higher speed and cutting efficiency.

The line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is on the order of 75:1.

In addition to the various other problems of the prior art, it has been discovered that excessive heat buildup will occur in rectified trimmer units. As hereinbefore explained, heat is generated by the internal resistance of the rectifier and when this occurs over an extended period of continuous usage of the device, heat is often generated to an extent such that the housing adjacent the rectifier tends to melt and thereby weaken the unit, if not producing warpage in the motor housing. It is a feature to reduce heat between the motor housing and the rectifier unit. In a particularly suitable embodiment of the present invention, therefore, such heat is reduced by providing air vent openings in the motor housing directly opposite the rectifier unit.

In its broadest concept, any type of motor may be employed for purposes of the present invention to rotate the head assembly. However, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a particular feature to employ an electric motor having characteristics especially suitable for such purposes.

It is yet another feature of the present invention to use a full-wave rectifier in conjunction with the electric motor to greatly increase motor torque, with accompanying greater cutting efficiency, while at the same time only slightly increasing motor RPM. This feature is of great importance because increased motor RPM increases the likelihood of line breakage and is therefore undesirable.

Because electric motors operate at maximum efficiency only when properly ventilated, it is a feature to provide means for forcing air to circulate about the electric motor herein. It is also a feature to provide air inlet holes sufficiently far away from the motor and the grass cutting operation that grass cuttings or other debris is not sucked into the air inlet holes.

These and other features and advantages of the present invention will become apparent from the following detailed description, wherein reference is made to the figures in the accompanying drawings.

IN THE DRAWINGS

FIG. 1 is a pictorial view showing the entire cutting apparatus.

FIG. 2 is a pictorial side view, partly in cross-section, of the apparatus depicted in FIG. 1, wherein the mechanical features and configuration of the apparatus are set forth in greater detail.

DETAILED DESCRIPTION

Referring now to FIGS. 1-2, a portable type edging device generally designated by the numeral 2 is shown, and which is of the type preferred for lighter tasks in residential-size plots or areas, and the like, where electrical power is immediately and conveniently available to the operator. Accordingly, the apparatus may be composed of a two-piece adjustable tubular member 4 and 6 having a casing 8 containing electric motor 10 mounted at one end, which motor drives a string cutting head 42. The motor 10, for example, may be a permanent magnet motor. The handle 6 is removable attached to and supports casing 8 by screws 15 insertable in shank 14. Such a device 2 is portable and is hand held and manipulated by an operator by means of a trigger handle 16 and intermediate handle 18. Handle 16 is attached to tubular member 4 by screws 25, whereas handle 18 is attached to tubular member 4 by an easily adjustable wing-nut assembly 27. Power may be applied to the motor 10 through a conventional electrical-type insulated cord or conductor 20, having an appropriate plug at one end (not shown), and having its other end passed through 10 by means of connectors 17 and 19 at contacts of a full-wave bridge rectifier 21. An appropriate ON-OFF switch or trigger 22 may conveniently be located adjacent handle 16 at the upper end of the tubular member 4, for interconnection with the conductor 20 and motor 10. The cutting plane of the cutting string 26 may be easily arranged in either a horizontal or vertical position, or tilted to any angle, to cut along sidewalks, around trees and rocks, and along fences and the like, where it is either unsafe or difficult to cut with conventional apparatus, merely by turning and manipulating handles 16 and 18. Additionally, an attitude adjustment mechanism 98 may be provided to enable tube member 16 to telescopically, rotatably and incrementally lock with respect to tube member 4, wherein an operator may adjust the attitude of the cutting head in relation to the ground.

Referring more particularly to FIG. 2, there may be seen a larger and more detailed pictorial representation of the apparatus depicted more generally in FIG. 1. More particularly, the apparatus or vegetation cutter 2 depicted therein may be seen to include a hollow casing 8 or the like, with a single string circular cutting head 42 which is rotated by the shaft 36 of an electrical motor 10 of suitable design mounted within casing 8.

The cutting head 42 may be further seen to include cutting strand 26 extending laterally from the cutting head 42 a distance which is a function of the present invention as will hereinafter be explained. As further indicated, the casing may have a circular flange portion or shield 30 for preventing the cutting head 42 from being brought into injurious contact with a wall or tree during its rotation by motor 10.

When the motor 10 is inactivated and the rotary head 42 is in a static condition, the cutting strand line 26 will tend to flexibly dangle to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIGS. 1 and 2. A spool containing surplus line is removably insertable into cutting head 42, and held in place by glide ball 32. In addition to securing the spool in place, glide ball 32 allows the device to be operated if desired without having to be continually and solely supported by the operator. The device 2 may be rested and propelled forward on the glide ball 32 when in operation if this type of cutting is found to be desirable. Generally the unit is supported by the operator at handles 16 and 18.

An electric motor operates in an optimum manner when the air around it is allowed to be circulated or otherwise cooled. The hollow casing 8 effectively allows air to freely circulate around motor 10, therefore providing forced air circulation. The plurality of upstanding fins 28 located on the top of cutting head 42 and extending radially outward from the axis thereof provide forced circulation of air about motor 10 when motor 10 rotates head 42. Rapid rotation of head 42, and hence of fins 28, causes said fins to create a low pressure zone within casing 8, whereby air is drawn from the atmosphere through openings 34 in shank 14 and passed over rectifier 21 and through casing 8 and around the motor 10 and expelled through the space 38 between flange 30 and cutting head 2. This circulation of air sufficiency cools both rectifier 21 and motor 10 to provide maximum efficiency and minimal ambient heat rise. Moreover, the openings 34, located in shank 14, are sufficiently removed from the cutting area that the cut grass of other debris flung up by line 26 is not likely to enter openings 34 along with the air.

As hereinbefore stated, it is conventional for AC current to be rectified before being applied to a permanent magnet motor, in order to eliminate all pulses of unwanted polarity. It will be apparent that such "half-wave" rectification results in elimination of half of all of the current pulses composing the AC power signal available, but this is not deemed significantly detrimental in most applications wherein simplicity and economy of design is of paramount importance. Accordingly, so-called "full-wave" rectification is not generally used except in those instances wherein a maximum terminal velocity is desired and, in those instances, it is usually if not always preferable to employ a motor having windings in lieu of permanent magnets, and to employ instead of commutator so as to eliminate all need for rectification of the AC signal.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as light-weight as possible, so that when the line shears or breaks during use and pieces are thrown from the cutting head 42, such pieces will travel only a limited distance and will strike persons or other objects in the immediate vicinity with little or no appreciable impact.

As hereinbefore explained, it is a feature of the present invention to provide against excessive heat buildup within the hollow casing 8 and adjacent rectifier 21. Referring now to FIG. 2, full-wave bridge rectifier is mounted stationarily within casing 8 and more particularly within the hollow shank portion or extension 14 which extends upwardly from casing 8. A plurality of air cooling or vent openings 34 are provided in the upper wall portion of hollow extension 14 and such openings are disposed in direct communication with the rectifier 21. Thus, there is provided a direct flow path of air from the atmosphere into openings 34 and directly across and around the rectifier 21. Any heat generated by the internal resistance of the rectifier is therefore immediately dissipated in contrast to prior devices wherein such heat was caused to build up. Such immediate heat dissipation is sufficient to eliminate melting or softening of the plastic material of construction of casing 8 and hollow shank portion 14 in the vicinity of the rectifier 21.

As hereinbefore explained, movement of fins 28 draws atmospheric air into openings 34 and expels same via space 38 between head 42 and shield 30. As also noted above, such cooling air circulation not only serves to vent heat generated by the rectifier 21 but also any undesirable heat generated by motor 10.

The above-described particular disposition of the rectifier 21 in the shank portion 14 of the casing or housing 8, and the particular location of the air intake openings 34 in immediate communication with the rectifier 21, provide the new and improved results of the device of the present invention over rectified units heretofore known, and provide a unit of increased cutting efficiency and one that is capable of prolonged usage yet operational without undesired heat accummulation.

While the details of construction and assembly of head member 42 form no particular feature of the present invention, reference is made herein to the prior copending application U.S. Ser. No. 746,685, wherein these features are set forth in detail. In addition, reference may be had to prior copending application U.S. Ser. No. 747,319, filed Dec. 3, 1976, and now U.S. Pat. No. 4,052,789, wherein there is disclosed a similar head assembly 42 usable herein.

It will thus be apparent that this invention proides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in contact with the operator's shoes, articules of clothing, or the like, without serious injury as would be the case with prior art devices.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and the like, comprising:
   head means rotatable about an axis in a cutting plane,
   electrically actuated driving means for rotating said head means in said plane and about said axis,
   a flexible non-metallic line member extending radially outwardly from the periphery of said head means,
   a housing supporting and enclosing said driving means,
   a rectifier located within said housing and interconnected with said driving means, and
   at least one air inlet opening in said housing opposite said rectifier.

2. The apparatus described in claim 1, said driving means being a permanent magnet motor.

3. The apparatus described in claim 2, said rectifier being a full-wave bridge rectifier for converting alternating power to direct power for said permanent magnet motor.

4. The apparatus described in claim 3 wherein said housing includes an upstanding section of hollow construction being connected to and in communication with said housing, a plurality of openings in said hollow section and being in communication with the atmosphere, a plurality of upstanding fin members associated with said head means and extending radially of said axis, said fin members upon rotation of said head means by said driving means creating a low pressure zone within said housing, whereby air is drawn from the atmosphere through said openings into said housing and around said rectifier and said driving means, thereby cooling said rectifier and said driving means.

5. The apparatus described in claim 4 wherein said rectifier is located in said hollow section of said housing opposite said openings.

6. In an apparatus for cutting vegetation and the like having a head rotatable about an axis in a cutting plane, a d.c. motor for rotating the head, a flexible nonmetallic line member extending radially from the periphery of the head into the cutting plane, a handle, a housing constructed of plastic material subject to melting or softening at elevated temperature, the housing supporting and enclosing the motor and including an upwardly extending hollow member in communication with the motor, a fan on said head for removing a flow of air from said housing, a tubular support member interconnection the handle and housing and including electrical power conductors extending to the motor, a rectifier connected in the conductors to provide d.c. power to the motor, the improvement comprising:

(a) an air induction opening carried in the hollow member at a location sufficiently removed from the cutting plane that cutting debris from the line member is not likely to enter the opening; and (b) said rectifier disposed in said hollow member opposite to said opening whereby the fan provides a flow of inducted air directly across said rectifier, past said motor and outwardly of said housing, and the air flow results in immediate head dissipation about said rectifier.

7. The apparatus of claim 6 wherein said opening is provided by vents provided in the walls of said hollow member.

8. The apparatus of claim 6 wherein the opening is provided in one of the walls of said hollow member and said wall faces away from said head.

* * * * *